UNITED STATES PATENT OFFICE.

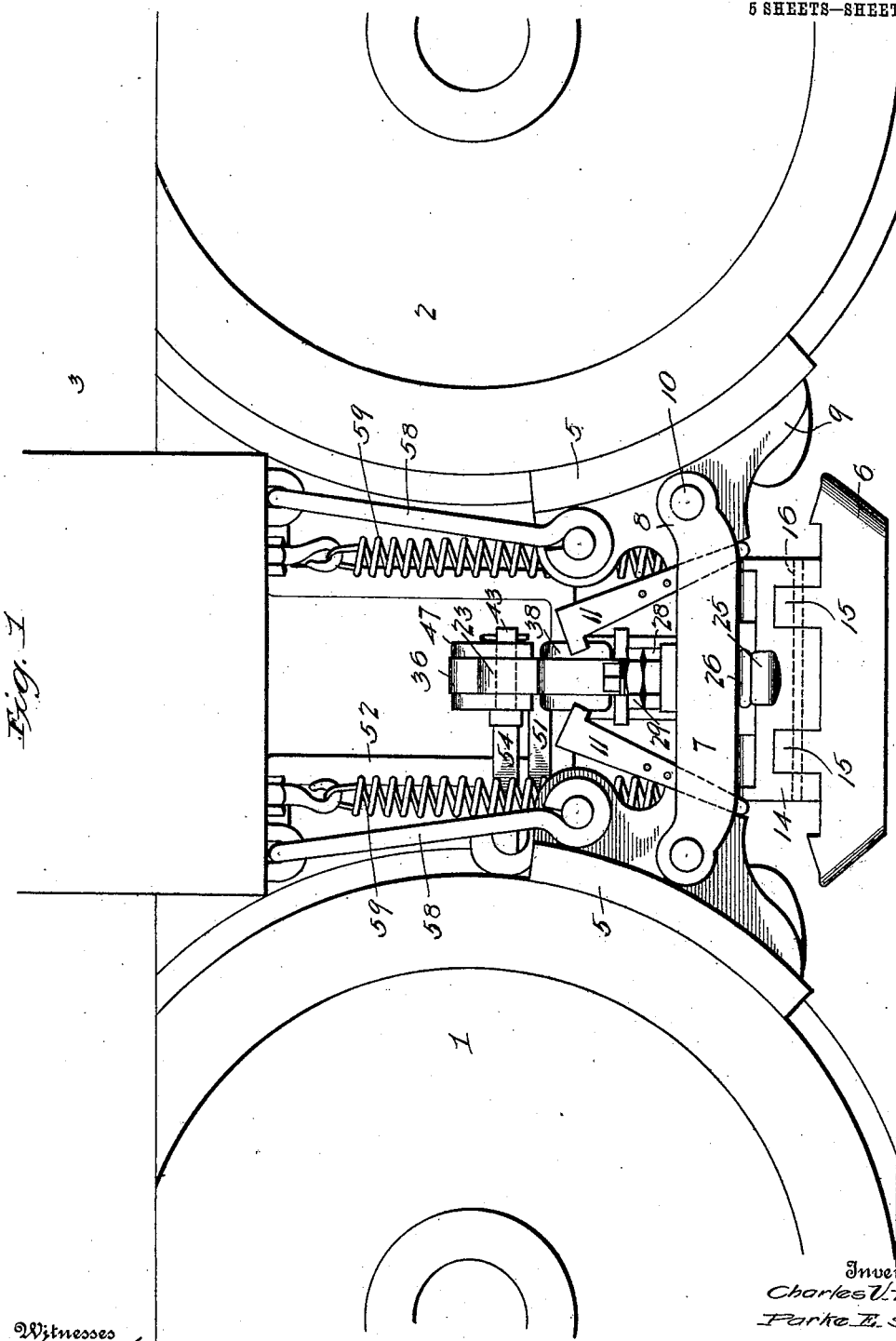

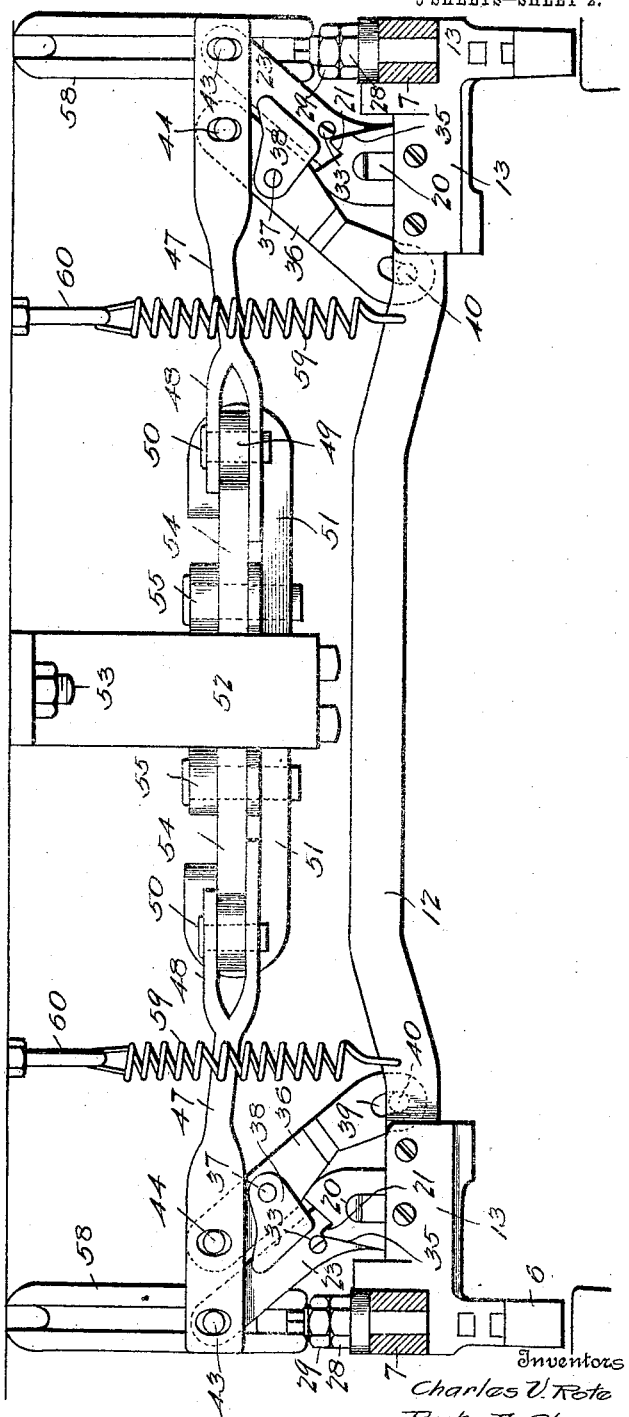

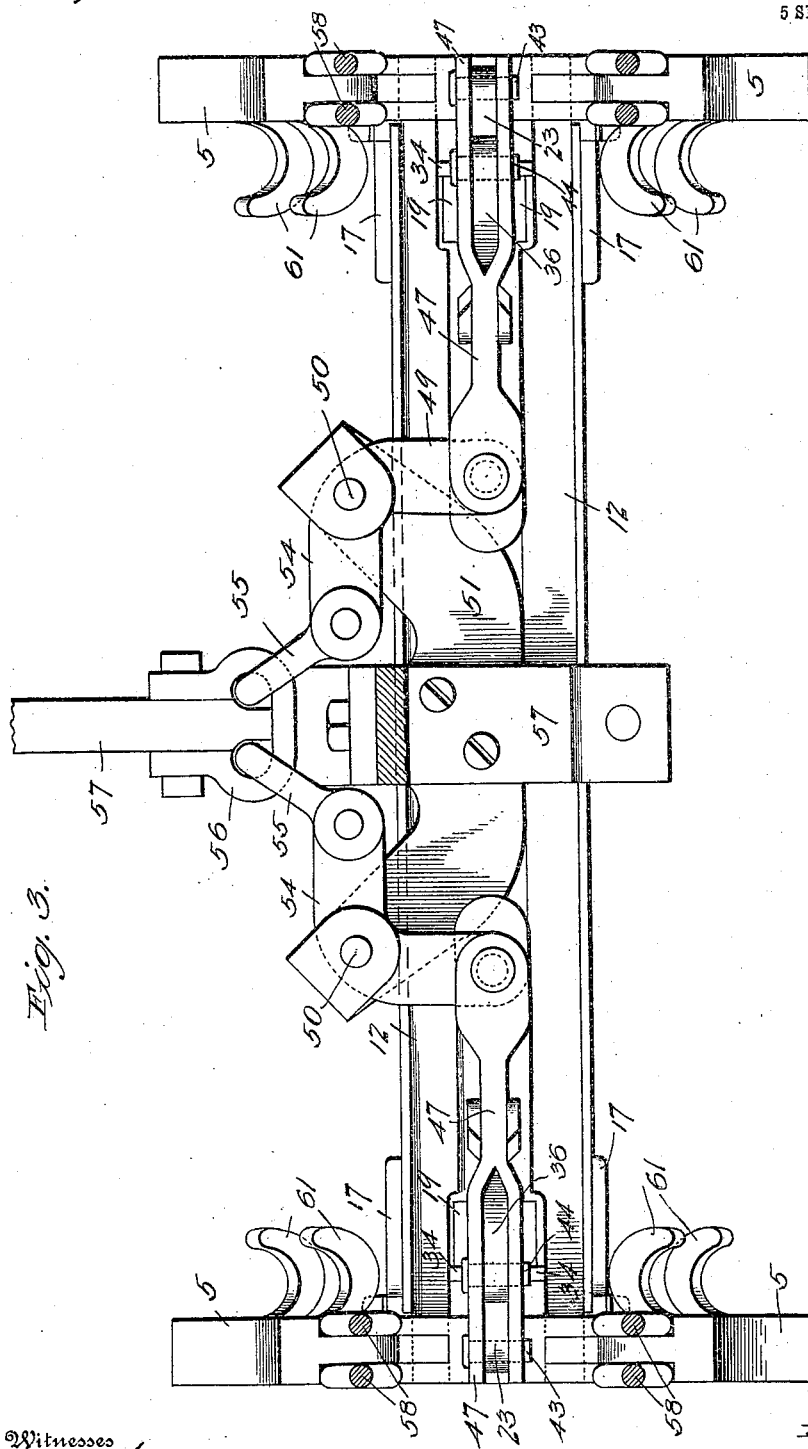

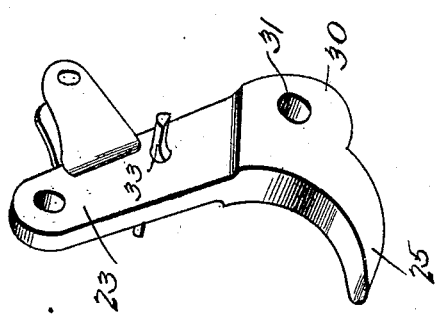
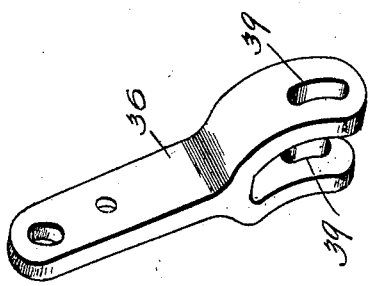
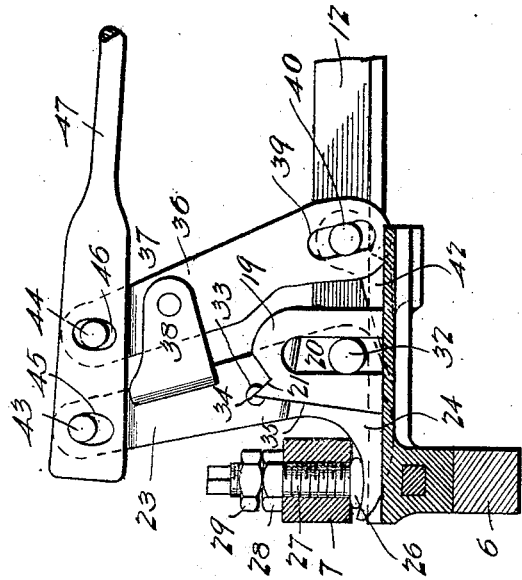

CHARLES V. ROTE AND PARKE E. SHEE, OF LANCASTER, PENNSYLVANIA.

CAR-BRAKE.

938,340.

Specification of Letters Patent.

Patented Oct. 26, 1909.

Application filed October 22, 1908. Serial No. 458,983.

*To all whom it may concern:*

Be it known that we, CHARLES V. ROTE and PARKE E. SHEE, both citizens of the United States, residing at Lancaster, in the county of Lancaster and State of Pennsylvania, have invented a certain new and useful Car-Brake, of which the following is a specification, reference being had therein to the accompanying drawing.

This invention relates to car brakes and has for its object to provide a combined wheel and rail brake of simple and reliable construction and operation, the brake mechanism being entirely automatic in action.

A further object of the invention is to provide means to compensate for and take up wear on the brake shoes by automatic adjustment.

A further object of the invention is to provide brake mechanism by means of which the wheel and rail brake shoes are caused to react upon each other thereby equalizing and distributing the pressure of the shoes against the wheels and rails.

A further object of the invention is to provide a construction and operation of the rail braking devices which will insure the rail brake shoe working clear of all the obstructions, projections and the like on the roadbed.

With these and other objects in view the nature of which will more fully appear as the description proceeds, the invention consists in the novel construction, combination and arrangement of parts as herein fully described, illustrated and claimed.

Figure 7:
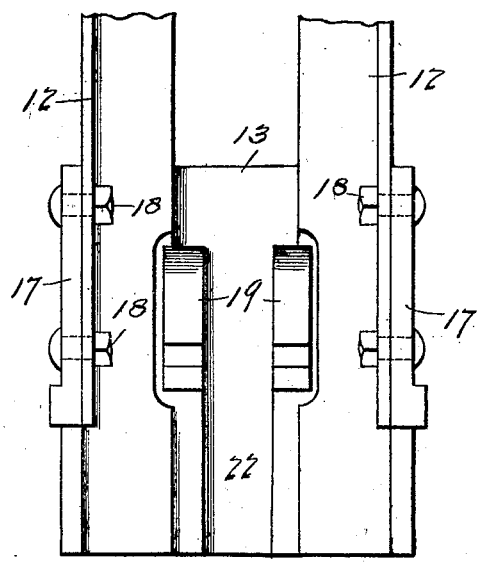
Figure 8:
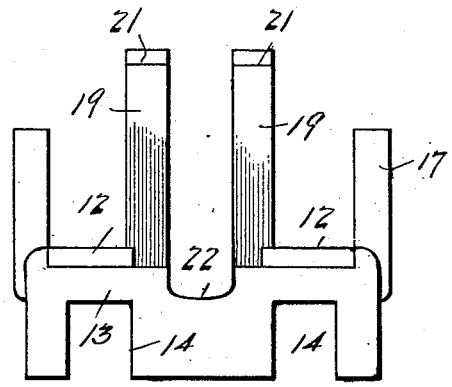
Figure 9:
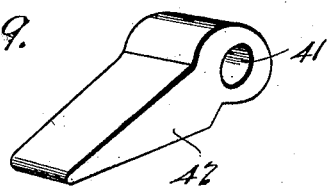

In the accompanying drawings:—Figure 1 is a side elevation of a sufficient portion of a car truck to illustrate the application thereto of the present invention. Fig. 2 is a vertical cross section taken to one side of the brake beam. Fig. 3 is a horizontal section taken above the brake beam and passing through the center bracket and the hangers which support the wheel brake shoes. Fig. 4 is a detail vertical section illustrating the operation of the brake lever and compensating lever and their connections. Fig. 5 is a detail perspective view of the brake lever. Fig. 6 is a similar view of the compensating lever. Fig. 7 is a plan view of one end of the brake beam, showing one of the brake blocks connected thereto. Fig. 8 is an end view of the same. Fig. 9 is a detail perspective view of one of the fulcrum blocks.

Referring to the drawings, 1 and 2 designate the truck wheels and 3 the truck frame embodying the usual bolster 4.

5 designates the oppositely arranged brake shoes which coöperate with the threads of the wheels 1 and 2, while 6 designates the rail brake shoe which is normally upheld out of contact with the underlying rail, as shown in Fig. 1. In mounting the several brake shoes of each set in such manner and relation as to adapt them to be simultaneously operated by a single operating device and to cause the force applied to the brake shoes to be directed simultaneously in opposite directions, we connect the wheel brake shoes 5 by means of a yoke or yoke bar 7 which is without joints. That is to say, the yoke bar is rigid from end to end, the opposite ends thereof being forked as shown at 8 to straddle the wheel brake shoe blocks 9, said blocks having pintles 10 which are received in the forked ends of the yoke bar 7 as shown in Fig. 1. This enables the brake shoes to adjust themselves to the treads of the truck wheels.

11 designates take up wedges which are inserted in the forked ends of the yoke bar 7 and behind the blocks 9 to compensate for excessive wear on the brake shoes 5.

The brake beam is of angle form, as illustrated in Fig. 3 and in the preferred embodiment of the invention, said brake beam is composed of parallel angle beams 12, to the opposite ends of which are rigidly secured brake blocks 13 having recesses 14 to receive upstanding lugs 15 on the rail brake shoe 6, said lugs 15 being formed with openings in line with other openings in the brake block to enable a key, indicated by dotted lines at 16, to be inserted through the overlapping portions of the rail brake shoe and said block for the purpose of fastening the shoe to the block and enabling a new shoe to be substituted when the old shoe is too far worn for further use.

One of the brake blocks 13 is illustrated in detail in Figs. 7 and 8 wherein it is seen to be bolted by means of side flanges 17 to the adjacent upstanding flanges of the angle beams 12 of the angle brake beam, said parts being shown as bolted together at 18. Each brake block is further provided with a pair of oppositely arranged upstanding guides 19 one of which is shown in side elevation in Fig. 4 wherein it is seen to comprise a central vertical slot 20, the purpose of which will hereinafter appear. Each guide is also provided with a V-shaped shoulder 21 adjacent to the upper end thereof, the function of which will be described later on. Each brake block also comprises a guide-way or gutter 22 in which the fulcrum block and heel portion of the brake lever work as will hereinafter appear. It will, of course, be understood that a brake block is employed at each end of the angle brake beam 12 in order to enable a pair of rail brake shoes to be supported by the brake beam over both rails of the track, as indicated in Fig. 2.

23 designates the main brake lever, the construction and arrangement of which is best illustrated in Figs. 4 and 5, in which it will be observed that said brake lever is of elbow form comprising an upstanding longer arm to which the numeral 23 is applied and a short arm 24 which is pointed and constitutes a presser or fulcrum toe 25 which is adapted to work between the adjacent brake block and the overlying yoke bar 7, as best shown in Fig. 4. The toe portion 25 of the brake lever works in contact with a bearing shoulder 26 which is made adjustable up and down relative to the yoke bar 7 by which it is carried. To this end, said bearing shoulder is provided with a threaded shank 27 which screws upwardly through a threaded hole in the yoke bar 7 thereby enabling the bearing shoulder 26 to be adjusted up and down to compensate for excessive wear in the rail brake shoes and the brake connections.

28 designates a lock nut and 29 a jam nut, both of which are threaded upon the shank 27 and adapted to screw up against the yoke bar 7 for the purpose of maintaining and fixing the adjustment of the bearing shoulder 26 against the lower rounded side of which the upper surface of the toe portion 25 of the brake lever works.

The brake lever is provided with a rounded heel portion 30 and just above said heel portion, the lever is provided with a hole 31 to receive a pin 32, the opposite ends of which project into and work up and down within the slots 20 of the guides 19 hereinabove referred to. The brake lever is also provided with a pin 33 extending transversely therethrough and having the projecting ends thereof formed with flattened shoulders or surfaces 34 which are adapted at a certain point in the throw of the brake lever to engage the inclined shoulders 21 of the guides 19. At other points in the rocking movement of the brake lever the rounded surfaces or shoulders of the pin 33 are adapted to ride against the outer edges 35 of the guides 19, as will hereinafter appear in connection with the description of the operation of the brake mechanism.

Arranged just behind each brake lever is a compensating lever 36 which is pivotally mounted at 37 between oppositely arranged pivot lugs 38 on the brake lever 23, as shown in Fig. 4. At its lower end, the compensating lever is provided with a slot 39 which receives a pin 40 inserted through a hole 41 in the rear end of a fulcrum block 42 (see Fig. 9) having the general form of a tongue, the said tongue shaped block 42 being thus adapted to be actuated by the compensating lever which operates to thrust the fulcrum block under the rounded heel portion 30 of the brake lever 23 simultaneously with the rocking movement of said brake lever. The fulcrum block 42 and the toe portion of the brake lever work in the channel or guide-way of the adjacent brake block, as indicated by dotted lines in Fig. 4. At their upper ends the brake lever 23 and the compensating lever 36 are provided with pins 43 and 44 which work in slots 45 and 46 in the outer end of a connecting rod 47 which extends toward the center of the truck frame.

By now referring to Figs. 2 and 3, it will be seen that we employ two of such connecting rods 47 and that the same have their inner ends forked as shown at 48 and pivotally connected to the corresponding arms 49 of a pair of bell crank levers which are fulcrumed adjacent to their elbows at the points 50 on bracket arms 51 extending in opposite directions from a bracket 52, the latter being bolted or otherwise fastened to the truck frame as indicated at 53. The other arms 54 of the bell crank levers are connected by links 55 to a clevis 56 attached to one end of the brake lever 57 by the longitudinal movement of which all of the brake shoes are set by the operation of the brake levers 23 which are controlled by means of the connections described.

The wheel brake shoe blocks 9 are supported by hangers 58 which admit of the necessary movement of the wheel brake shoes, while the brake beam 12 is yieldingly supported by means of spiral springs 59 attached at the lower ends to said beam and supported at their upper ends from the truck frame by means of hooks 60 or their equivalent.

61 designates flanges engaging fingers which are provided on the inner sides of each of the brake shoes 5 to hold said shoes in proper alinement with the tread portion and flanges of the wheels in connection with which they operate.

In the application of the brakes, the levers 23 and 36 are simultaneously actuated by the connecting rods 47. As each connecting rod 47 is drawn inward toward the center of the truck by the means above described, the rounded shoulder of the pin 33 rides upward against the shoulders formed by the outer edges 35 of the guides 19 as illustrated in Fig. 2. Just before the brake shoes are set against the wheels and rails, the pin 33 rides over the upper extremity of the shoulder and interlocks with the inwardly inclined shoulder 21 of the guide as shown in Fig. 4. At the same time, the fulcrum block 42 is slid under the heel portion of the adjacent brake lever, thus compensating for wear in the brake shoe and causing the toe portion of the brake lever to act as a pry between the adjacent brake block and the overlying yoke bar 7, the result being that the force is applied by the brake lever simultaneously in opposite directions to the rail brake shoe and the wheel brake shoes. This results in setting all of the shoes and causes said shoes to react upon each other, thereby forming a particularly effective and reliable brake. The means described also renders the brake mechanism, as a whole, self-adjusting or compensating.

It will be noted that the slots 45 and 46 are expanded in width between the ends thereof, this being done to permit a limited amount of relative play between the levers and connecting rods as the pins 33 move up the guides 19 and over the shoulders 21 of said guides. The levers 36 are thus allowed to remain practically inactive until the pins 33 pass over the shoulders 21, whereupon both sets of levers 23 and 36 work in conjunction, adding greatly to the efficiency of the brake. Furthermore, by the construction described the rail brake shoes may be set to lie inactively and make their start from a point one half inch, if necessary, above the track rails.

Having described the invention, what we claim is:—

1. A car brake comprising two opposed wheel brake shoes, a yoke bar connecting said shoes, a rail brake shoe, a bearing shoulder on said yoke bar projecting from the lower side thereof, and brake actuating mechanism embodying an element which operates between said bearing shoulder and the rail brake to force the same in opposite directions.

2. A car brake comprising two opposed brake shoes, a yoke bar connecting said shoes, a bearing shoulder on said yoke bar, means for adjusting said shoulder relatively to the yoke bar, a rail brake shoe, and brake actuating mechanism embodying an element which operates between said shoulder and rail brake shoe to force the same in opposite directions.

3. A rail brake comprising two opposed wheel brake shoes, a yoke bar connecting said shoes, a shoulder having a threaded and adjustable connection with said yoke bar, a rail brake shoe, and brake actuating mechanism embodying an element which operates between said shoulder and the rail brake shoe to force the same in opposite directions.

4. A car brake comprising two opposed wheel brake shoes, a yoke bar connecting said shoes, a shoulder provided with a threaded shank adjustable through a threaded opening in the yoke bar, a lock nut for said shank, a rail brake shoe, and brake actuating mechanism embodying an element which operates between said shoulder and rail brake shoe to force the same in opposite directions.

5. A car brake comprising two opposed wheel brake shoes, a yoke bar connecting said shoes, a rail brake shoe, two levers arranged close together, one operating between the yoke bar and the rail brake shoe to force the same in opposite directions, and a sliding fulcrum block actuated by the other lever and coöperating with the first lever.

6. A car brake comprising two opposed wheel brake shoes, a yoke bar connecting said shoes, a rail brake shoe, and brake actuating mechanism embodying a brake lever operating between said yoke and brake shoe, a compensating lever fulcrumed on said brake lever and a sliding fulcrum block actuated by the compensating lever coöperating with said brake lever.

7. A car brake comprising two opposing wheel brake shoes, a yoke bar connecting said shoes, a rail brake shoe, and brake actuating mechanism embodying a brake lever which operates between said yoke and rail brake shoe, a compensating lever, and a fulcrum block actuated by the compensating lever and coöperating with the brake lever.

8. A car brake comprising two opposed wheel brake shoes, a yoke bar connecting said shoes, a rail brake shoe, and brake actuating mechanism embodying a brake lever operating between the yoke bar and rail brake shoe, a compensating lever, a sliding fulcrum block actuated by the compensating lever and coöperating with the brake lever, and a connecting rod coupling said brake lever and compensating lever together for simultaneous movement.

9. A car-brake comprising two opposed wheel brake shoes, a yoke bar connecting said shoes, a rail brake shoe, and brake actuating mechanism embodying a brake lever operating between the yoke bar and rail brake shoe, a compensating lever, and a fulcrum block actuated by the compensating lever, the brake lever and compensating lever being actuated in such manner that a relatively accelerated active movement is imparted to the fulcrum block.

10. A car brake comprising two opposed wheel brake shoes, a yoke bar connecting said shoes, a rail brake shoe, and brake actuating mechanism embodying a brake lever, a guide for said brake lever, and coöperating shoulders on said lever and guide.

11. A car brake comprising two opposed wheel brake shoes, a yoke bar connecting said shoes, a rail brake shoe, and brake actuating mechanism embodying a brake lever provided intermediate its ends with a shoulder, and a brake beam provided with a guide for said brake lever having a shoulder to coöperate with the shoulder on the brake lever, said shoulders being arranged to interlock simultaneously with the application of the brake shoes to the wheels and the rail.

12. A car brake comprising two opposed wheel brake shoes, a yoke bar connecting said shoes, a rail brake shoe, and brake actuating mechanism embodying a brake lever operating between the yoke bar and rail brake shoe, a compensating lever, a fulcrum block actuated thereby and coöperating with the brake lever and a connecting rod engaging both of said levers for simultaneous operation.

13. A car brake comprising two opposed wheel brake shoes, a yoke bar connecting said shoes, a rail brake shoe, and brake actuating mechanism embodying a brake lever operating between the yoke bar and rail brake shoe, a compensating lever pivotally connected with the brake lever, a fulcrum block actuated by the compensating lever and a connecting rod engaging both of said levers for simultaneous operation.

14. A car brake comprising two opposed wheel brake shoes, a yoke bar connecting said shoes, a compensating shoulder on said yoke bar, and brake actuating mechanism embodying an element which operates between the rail brake shoe and said compensating shoulder to force the wheel brake shoes and the rail brake shoe in opposite directions.

15. A car brake comprising two opposed wheel brake shoes, a yoke bar connecting said shoes, a rail brake shoe, and brake actuating mechanism embodying a brake lever operating to force the yoke bar upward and the rail brake shoe downward, a compensating lever, a fulcrum block having a jointed connection with said compensating lever and coöperating with the brake lever, and an adjustable bearing shoulder between the brake lever and the yoke bar.

In testimony whereof we affix our signatures in presence of two witnesses.

CHARLES V. ROTE.
PARKE E. SHEE.

Witnesses:
F. NARDE SHEE,
CHAS. W. EABY.